United States Patent Office 2,941,253
Patented June 21, 1960

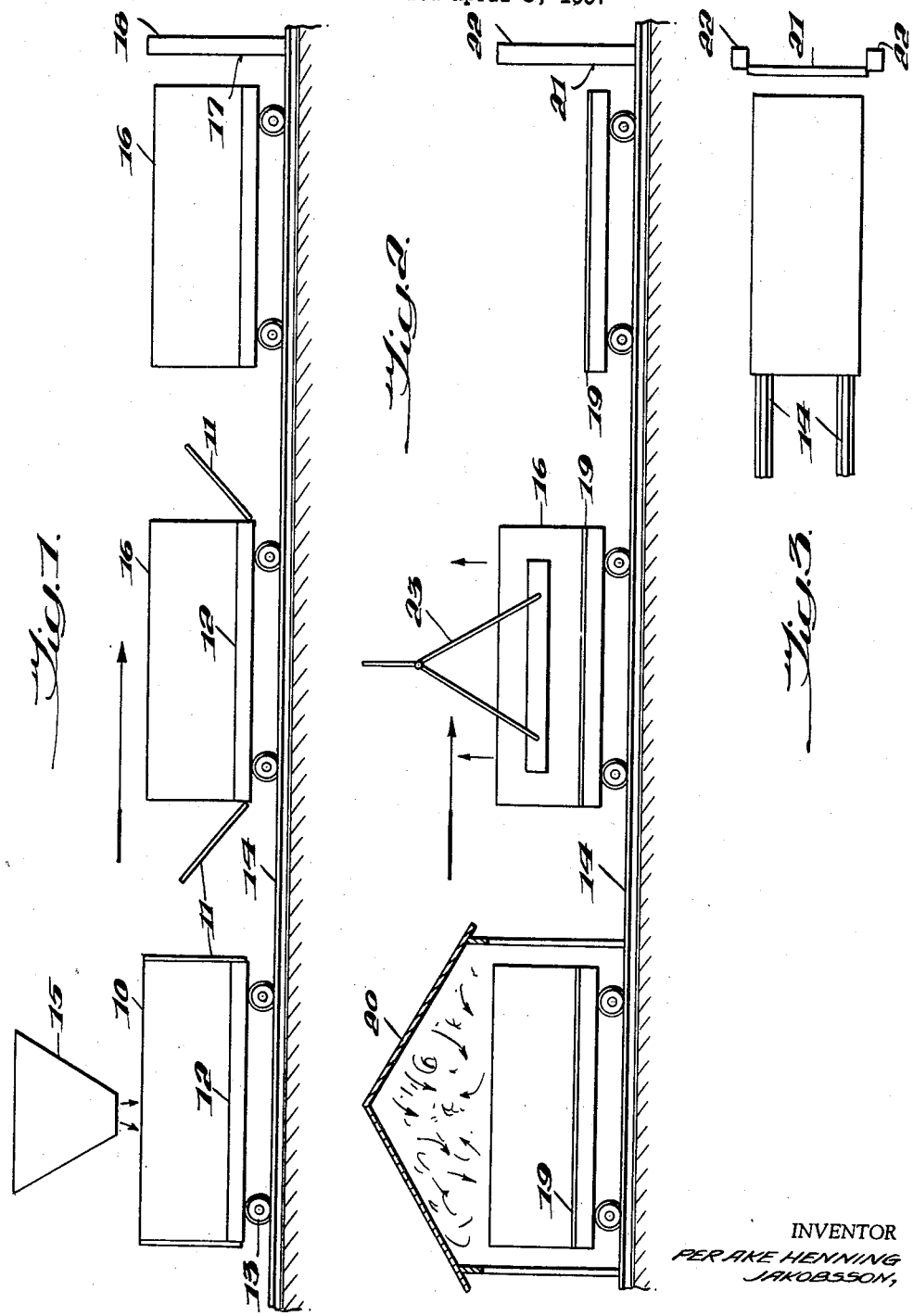

2,941,253

METHOD FOR THE PRODUCTION OF LIGHTWEIGHT CONCRETE

Per Åke Henning Jakobsson, Kumla, Sweden, assignor to International Ytong-Stabalite Company Ltd., London, England, a corporation of Great Britain Filed Apr. 8, 1957, Ser. No. 651,135

Claims priority, application Sweden May 9, 1956

2 Claims. (Cl. 18—47.5)

This invention relates to a method for the production of building bodies of lightweight concrete.

Building bodies of lightweight concrete are usually produced by casting a gruel-like mass of hydraulically binding components in large moulds of heat-resisting material. The mass is then left to set in the moulds, during which time it becomes porous. When the mass has become somewhat hardened to a self-bearing consistency, although still sufficiently plastic to allow it to be cut, it is divided into smaller units of desirable dimensions. Thereafter the mass is cured by hardening in an autoclave by means of steam with high pressure and high temperature.

In order to prevent sticking of the mass to the bottoms of the moulds during the setting and curing, the bottoms of the moulds are oiled. However, the building bodies obtained from the mould bottom have a surface which is oily and which has a plane which is completely dependent on the condition of the mould bottom.

The present invention relates to a method of obtaining a working surface for the mould bottom which is completely plane and furthermore is free from oil. The invention is chiefly characterized in that a layer of the forming material is left on the mould bottom during the steam curing.

The invention will now be further described with reference to the drawing, in which:

Figure 1 is a diagrammatic view of the method according to the invention, shown in side elevation;

Figure 2 is a continuation of Figure 1; and

Figure 3 is a top plan view of the cutting operation.

With reference now to Figure 1, reference 10 generally indicates a mould for the production of building bodies of lightweight concrete. The mould has sides 11, a bottom 12, and is mounted on wheels 13 which run on rails 14. The raw mass consisting of liquid cementitious material is mixed by the usual method and poured into the mould 10 through hopper 15. The mass 16 is then allowed to set until it has reached a suitable volume and consistency, whereupon the sides are removed from the mould as shown in Figure 1. The mass 16 is then passed through a cutting wire or blade 17 which is mounted on supports 18, and the main portion of the mass is separated from the mould bottom 12 by a cut about 10 mm. above the mould bottom, leaving a bottom layer 19. At the same time the main mass may be divided into building blocks of suitable dimensions by any appropriate means.

In Figure 2 the mass 16 is shown being cured in an autoclave 20 by means of steam at high pressure and temperature. After steam hardening the mould is removed from the autoclave and the mass 16 lifted from the mould by means of apparatus 23. The bottom layer 19 remains in the mould bottom owing to the fact that it has stuck there during the steam curing.

The moulds could then be used immediately for new castings, and the new mass separated from the mould bottom by a cut somewhat above the steam hardened layer 19. However, the risk then occurs that the bottom layer will increase so that the building bodies become smaller and smaller at each casting. In order to eliminate this difficulty, the bottom layer 19 is calibrated before each new casting by cutting off about 5 mm. of the bottom layer with some suitable cutting arrangement such as the blade 21 mounted on supports 22 as shown in Figure 2 and the top plan view in Figure 3.

By leaving the bottom layer 19 in the mould, the surface on which the new forming mass is poured is completely plane and free from oil. In addition, it appears that the heat insulating effect of the bottom layer has a favorable influence on production.

What is claimed is:

1. A method for the production of building bodies of lightweight concrete and the like comprising the steps of pouring a liquid cementitious forming mass into a mold, partially hardening the mass until it reaches a suitable consistency for cutting, separating a thin layer which remains on the mould bottom from the bottom of the mass, steam hardening the mass, removing the main portion of the mass from the mould, and producing additional bodies by pouring forming mass onto the thin layer remaining in the mould bottom.

2. A method according to claim 1, comprising the additional step of calibrating the mould before pouring additional bodies by cutting a thin slice from the upper surface of the layer remaining in the mould bottom.

References Cited in the file of this patent

UNITED STATES PATENTS

| | | |
|---|---|---|
| 213,601 | Woffenden | Mar. 25, 1879 |
| 1,374,403 | Smith | Apr. 12, 1921 |
| 1,899,137 | Crume | Feb. 28, 1933 |
| 2,694,846 | Olsson et al. | Nov. 23, 1954 |